(12) United States Patent
Walwadkar (10) Patent No.: US 12,506,774 B2
(45) Date of Patent: Dec. 23, 2025

(54) SYSTEMS AND METHODS FOR NETWORK ENDPOINT DEVICE SECURITY FABRIC

(71) Applicant: Fortinet, Inc., Sunnyvale, CA (US)

(72) Inventor: Radhesh Walwadkar, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 311 days.

(21) Appl. No.: 18/129,501

(22) Filed: Mar. 31, 2023

(65) Prior Publication Data

US 2024/0333760 A1 Oct. 3, 2024

(51) Int. Cl.
*H04L 9/40* (2022.01)

(52) U.S. Cl.
CPC ...... *H04L 63/1466* (2013.01); *H04L 63/1491* (2013.01)

(58) Field of Classification Search
CPC .......... H04L 63/1466; H04L 63/1491
See application file for complete search history.

(56) References Cited

U.S. PATENT DOCUMENTS

| | | | |
|---|---|---|---|
| 2007/0245417 A1* | 10/2007 | Lee | H04L 63/1458 726/22 |
| 2019/0124112 A1* | 4/2019 | Thomas | G06F 21/45 |

* cited by examiner

*Primary Examiner* — Bryan Y Lee
(74) *Attorney, Agent, or Firm* — Jaffery Watson Hamilton & DeSanctis LLP (57) ABSTRACT

Various embodiments provide systems and methods for detecting and/or stopping lateral movement between endpoint devices by malicious actors.

16 Claims, 5 Drawing Sheets

SYSTEMS AND METHODS FOR NETWORK ENDPOINT DEVICE SECURITY FABRIC

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for policing network activities, and more particularly to systems and methods for detecting and/or stopping lateral movement between endpoint devices by malicious actors.

BACKGROUND

Many processes and systems exist to detect and stop access to endpoint devices within a secure network. For example, a firewall may be used that allows only defined processes to access a given endpoint device. Such processes and systems have proven effective, but not perfect in protecting endpoint device. Once a malicious actor has breached the security features protecting endpoint devices within a secure network, there is little to stop the malicious actor from moving laterally to other endpoint devices within the same secure network as the breached endpoint device often includes all of the authorizations required to access other endpoint devices within the same secure network.

Hence, there exists a need in the art for advanced approaches for securing endpoint devices in a secure network.

SUMMARY

Various embodiments provide systems and methods for detecting and/or stopping lateral movement between endpoint devices by malicious actors.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for detecting and/or stopping lateral movement between endpoint devices by malicious actors.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "network accessible service" "or "network accessible process" may be any service or process accessible via a communication network. As an example, a network accessible service may be an audio communication and/or video communication service such as, for example, Zoom™ that allows two or more end users to communicate over a communication network. As another example, a network accessible service may be a word processing service such as, for example, Office365™. Based upon the disclosure provided herein, one of ordinary skill in the art will recognize a variety of network accessible services and/or network accessible processes that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for automatically detecting malicious, lateral movement in a network. Such methods include: detecting, by a processing resource of a first endpoint network element, an attempt to perform a first behavior on the first endpoint network element; detecting, by the processing resource of the first endpoint network element, an attempt to perform a second behavior on a second endpoint network element, where the second behavior involves a second endpoint network element, and where both the first endpoint network element and the second endpoint network element are included within a communication network protected by a network security appliance; and blocking, by the processing resource of the first endpoint network element, the second behavior based at least in part on first detecting the first behavior and subsequently detecting the second behavior.

In some instances of the aforementioned embodiments, the methods further include removing, by the processing resource of the first endpoint network element, a malicious entity from the first endpoint network element responsible for causing the first behavior. In various instances of the aforementioned embodiments, the attempt to perform the first behavior is an attempt to access to credentials stored on the first endpoint network element, and the attempt to perform the second behavior is an attempt to access the second endpoint network element. In some such instances, the methods further include displaying, by the processing resource of the first endpoint network element, a lateral access bait. In such instances the attempt to access the second endpoint network element is done by selecting the lateral access bait.

In various instances of the aforementioned embodiments where the attempt to perform the first behavior is an attempt to access credentials stored on the first endpoint network element, and the attempt to perform the second behavior is an attempt to perform a network services scan, the second endpoint network element would be reported if the network services scan is allowed to proceed.

In some instances of the aforementioned embodiments, the methods further include: requesting from a reputation service, by the processing resource of the first endpoint network element, a reputation of an entity attempting to perform the first behavior on the first endpoint network element; receiving, by the processing resource of the first endpoint network element, an indication that the entity is not a known malicious actor; allowing, by the processing resource of the first endpoint network element, performance of the first behavior on the first endpoint network element based at least in part on the indication that the entity is not a known malicious actor; and setting, by the processing resource of the first endpoint network element, a flag at a location in the first endpoint network element indicating the performance of the first behavior on the first endpoint network element. In some such instances where the attempt to perform the first behavior is an attempt to access credentials stored on the first endpoint network element, blocking the second behavior based at least in part on first detecting the first behavior and subsequently detecting the second behavior includes accessing the location in the first endpoint device to determine performance of the first behavior on the first endpoint network element.

In various instances of the aforementioned embodiments where the attempt to perform the first behavior is an attempt to access credentials stored on the first endpoint network element, and the attempt to perform the second behavior is an attempt to access the second endpoint network element, the methods further include detecting, by the processing resource of the first endpoint network element, an attempt to perform a third behavior on the second endpoint network element, where the attempt to perform the third behavior is an attempt to perform a network services scan. In such instances, blocking the second behavior is based at least in part on first detecting the first behavior, followed by detecting the third behavior, and subsequently detecting the second behavior.

Other embodiments provide systems for mitigating malicious, lateral movement in a network. Such systems include a first endpoint network element having a process resource and a non-transient computer readable medium coupled to the processing resource. The non-transient computer readable medium has stored therein instructions that when executed by the processing resource cause the processing resource to: detect an attempt to perform a first behavior on the first endpoint network element; detect an attempt to perform a second behavior on a second endpoint network element, where the second behavior involves a second endpoint network element, and where both the first endpoint network element and the second endpoint network element are included within a communication network protected by a network security appliance; and block the second behavior based at least in part on first detecting the first behavior and subsequently detecting the second behavior.

Yet other embodiments provide non-transient computer readable media having stored therein instructions that when executed by the processing resource cause the processing resource to: detect an attempt to perform a first behavior on the first endpoint network element; detect an attempt to perform a second behavior on a second endpoint network element, where the second behavior involves a second endpoint network element, and where both the first endpoint network element and the second endpoint network element are included within a communication network protected by a network security appliance; and block the second behavior based at least in part on first detecting the first behavior and subsequently detecting the second behavior.

Figure 1A:
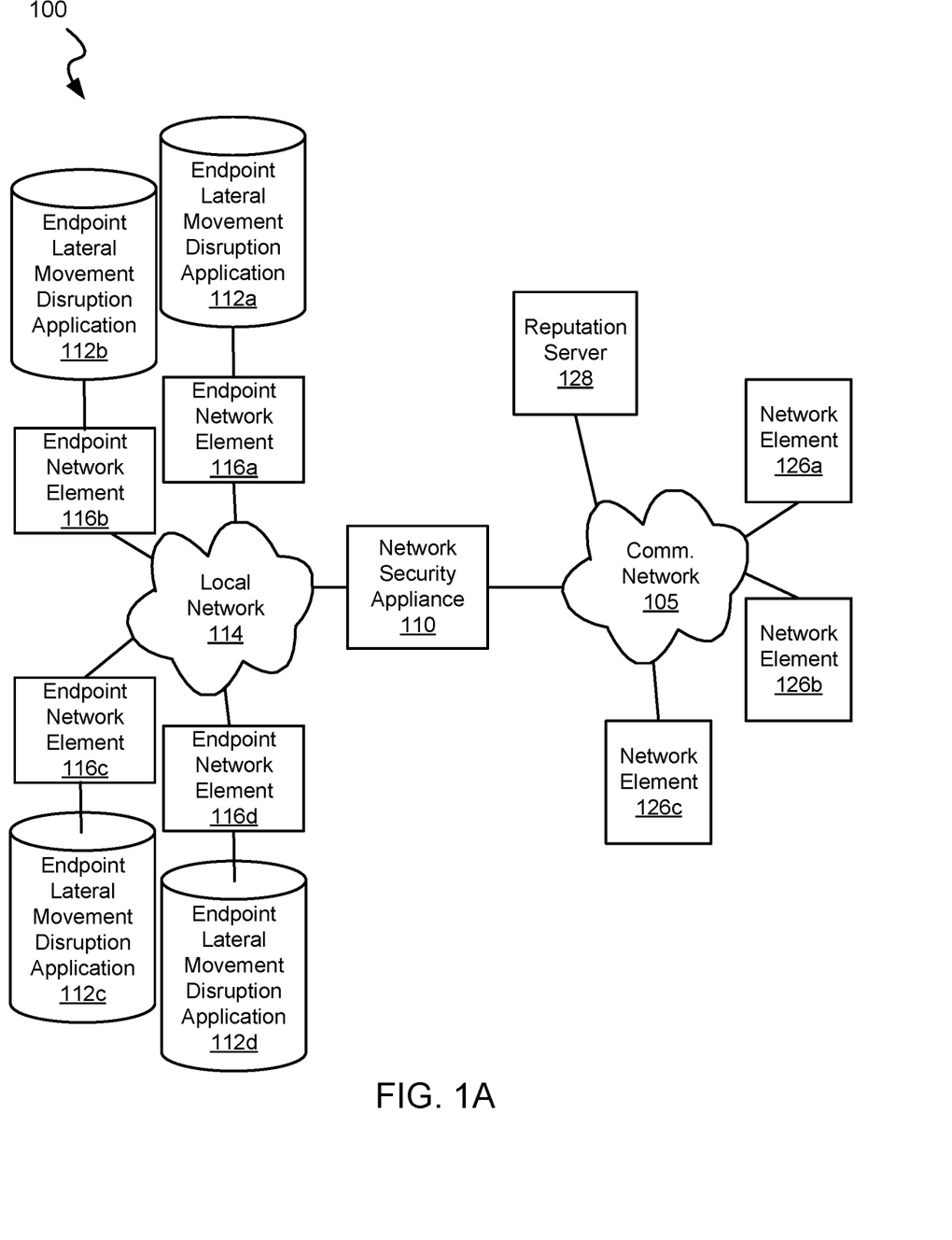
FIGS. 1A-1C illustrate a network architecture including endpoint network elements each executing an endpoint lateral movement disruption application in accordance with some embodiments.

Turning to FIG. 1A, network architecture 100 is shown that includes endpoint network elements 116 (i.e., endpoint network element 116a, endpoint network element 116b, endpoint network element 116c, and endpoint network element 116d) each executing an endpoint lateral movement disruption application 112 (i.e., endpoint lateral movement disruption application 112a, endpoint lateral movement disruption application 112b, endpoint lateral movement disruption application 112c, and endpoint lateral movement disruption application 112d) in accordance with some embodiments. In the context of network architecture 100, endpoint network elements 116 are coupled to a local network 114. Local network 114 may be any type of communication network known in the art. Those skilled in the art will appreciate that, local network 114 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Additionally, other network elements 126 (i.e., network element 126a, network element 126b, network element 126c, and network element 126d) are shown that are coupled to a communication network 105. Local network 114 may be any type of communication network known in the art. Those skilled in the art will appreciate that, communication network 105 can be wireless network, a wired network, or a combination thereof that can be implemented as one of the various types of networks, such as an Intranet, a Local Area Network (LAN), a Wide Area Network (WAN), an Internet, and the like. Further, communication network 105 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110. Network security appliance 110 provides a variety of network security features as are generally known in the art. As such, network security appliance 110 protects endpoint network elements 116 from a variety of threats, however, in some cases a malicious actor may gain access to one or more of endpoint network elements even with the security offered by network security appliance 110.

Network architecture 100 further includes a reputation server 128. Reputation server 128 may be any server or cloud service that is capable of providing information about the reputation of an actor attempting to access elements of local network 114 including, but not limited to, endpoint network elements 116 and/or network security appliance 110. In some embodiments, reputation server 128 is configured to receive information about an actor attempting to access a network element, and in return may provide an indication as to whether the actor is a known malicious actor, is unknown, or it is inconclusive whether the actor is a known malicious actor. Based upon the disclosure provided herein, one of ordinary skill in the art will recognize a variety of reputation services that may be used in relation to different embodiments.

Figure 1B:
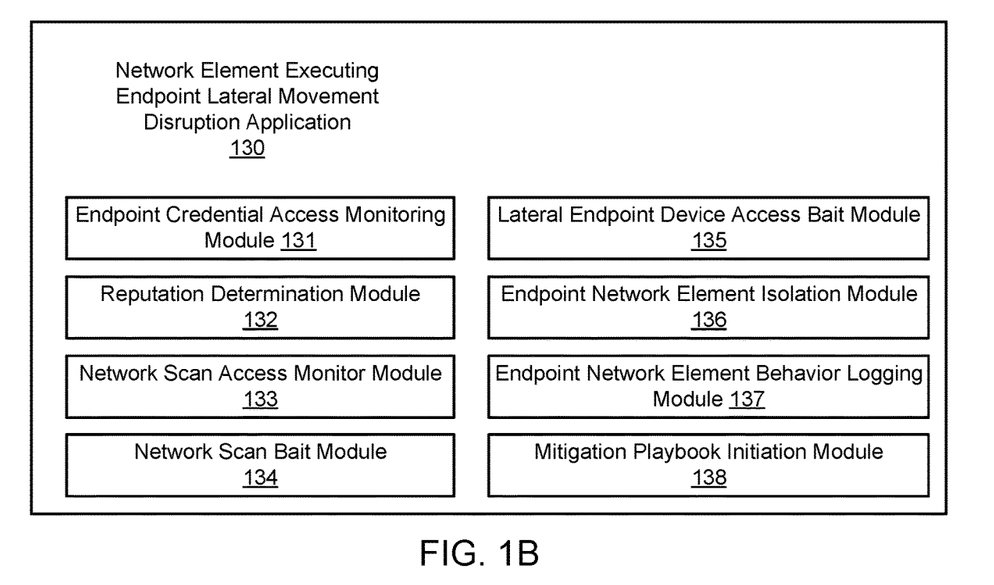

Turning to FIG. 1B, an example implementation of an endpoint network element executing an endpoint lateral movement disruption application 130 (e.g., endpoint network element 116a executing endpoint lateral movement disruption application 112a) is shown in accordance with some embodiments. As shown in this example, endpoint network element executing an endpoint lateral movement disruption application 130 includes: an endpoint credential access monitoring module 131, a reputation determination module 132, a network scan access monitor module 133, a network scan bait module 134, a lateral endpoint device access bait module 135, an endpoint device isolation module 136, an endpoint network element logging module 137, and a mitigation playbook initiation module 138.

Endpoint credential access monitoring module 131 is configured to monitor any access to endpoint credentials maintained on an endpoint network element executing the module. This may include, for example, monitoring whether an attempt has been made to dump credentials from the operating system executing on the endpoint network element or from an application executing on the endpoint network element. Such an attempt to dump credentials may be done using a number of access tools that are known in the art such as, for example, using Carbanak that obtains Windows™ logon password details. Based upon the disclosure provided herein, one of ordinary skill in the art will recognize a variety of methods that may be used to dump credentials from an endpoint network element. Monitoring to determining whether a credential dump is being attempted may include, but are not limited to, monitoring access to one or more locations where credentials of the endpoint network element are stored. Anytime such a location is accessed, an access of the credentials of the endpoint network device is flagged, access to the credentials is temporarily blocked, and reputation determination module 132 is initiated.

Reputation determination module 132 is configured to access a reputation server. In some embodiments, this includes providing information identifying an actor accessing the endpoint network element that is requesting access to the credentials. In return, the reputation server provides an indication as to whether the actor attempting access is a known malicious actor. Where the reputation server returns an indication that the entity attempting to access the credentials is a known malicious actor, reputation determination module 132 permanently blocks the identified malicious actor from accessing the credentials of the endpoint network element. As such, the malicious actor is denied credentials that could be used to move laterally from one endpoint network element to another within a secure network. Alternatively, where the reputation server returns anything but an indication that the accessing entity is a malicious actor, reputation determination module 132 removes the temporary block of the credentials of the endpoint network elements allowing the entity to access the credentials. In some cases, this may result in granting access to a malicious actor that was not previously known as a malicious actor to the reputation server. Additionally, reputation determination module 132 flags the access to the credentials. In some cases, this flag is temporary and is removed a defined time period after it is set. Such a time period may be, for example, two weeks.

Network scan access monitor module 133 is configured to determine whether a request to perform a network service scan has been received. Such a request to perform a network service scan may be an attempt by a malicious actor to get a listing of services running on hosts within a secure network in which the endpoint network element resides and/or local network infrastructure devices within the secure network. Such a scan may be focused on listing those elements within a secure network that may be vulnerable to remote software exploitation. Such a network services scan may be done, but is not limited to, identifying port and/or vulnerability scans using tools that are brought onto a system. As an example, a network services scan requested from a particular endpoint network element may attempt to discover services running on other endpoint network elements within the same secure network. Based upon the disclosure provided herein, one of ordinary skill in the art will recognize a variety of tools that may exist on a given endpoint network element that can perform such a network services scan, and/or a variety of tools that may be introduced to a given endpoint network element to perform such a network services scan. In some embodiments, execution of any known tool for executing a network services scan constitutes a request to perform a network service scan. In other embodiments, a module is included that identifies any attempt to access another network element within the same network, and detection of such an attempt is considered a request to perform a network service scan. Based upon the disclosure provided herein, one of ordinary skill in the art will recognize other approaches for detecting a network services scan that may be done in relation to different embodiments.

When a network service scan is detected by network scan access monitor module 133, network scan access monitor module 133 accesses a location in memory designated to hold the flag indicating a recent access to credentials on the endpoint network element. Where the location does not include a flag indicating a recent access to the credentials, network scan access monitor module 133 allows the requested network services scan to continue. Alternatively, where the location does not include a flag indicating a recent access to the credentials, network scan access monitor module 133 calls endpoint network element logging module 137 to log the access details associated with the requested network scan in preparation for a potential mitigation of a malicious actor operating on the endpoint network element. This logging may include, but is not limited to, an IP address of the actor accessing the endpoint network element and a series of behaviors exhibited by the endpoint network element leading up to the network services request. Based upon the disclosure provided herein, one of ordinary skill in the art will recognize a variety of information which may be logged in relation to a potential attack from a malicious actor.

In some embodiments, network scan bait module 134 is configured to provide an easy access that purportedly causes a network service scan to occur, but in actuality is a trap for an unwary malicious actor. In some embodiments, the bait is an icon displayed by endpoint network element that appears to give easy access to a network services scan. In such embodiments, network scan access monitor module 133 additionally determines whether the requested network services scan was initiated by the bait provided by network scan bait module 134. Where the detected network services scan was initiated via the lateral scan bait, network scan access monitor module 133 considers the requested network services scan to have been done by a malicious actor as others would be aware of the decoy nature of the icon. In such a situation, network scan access monitor module 133 calls endpoint network element logging module 137 to log the access details associated with the requested network scan in preparation for a potential mitigation of a malicious actor operating on the endpoint network element. This logging may include, but is not limited to, an IP address of the actor accessing the endpoint network element and a series of behaviors exhibited by the endpoint network element leading up to the network services request. Based upon the disclosure provided herein, one of ordinary skill in the art will recognize a variety of information which may be logged in relation to a potential attack from a malicious actor.

In addition, network scan access monitor module 133 determines whether the endpoint network element has previously been isolated. Such isolation is a process whereby access to and from the endpoint network element is limited to only accesses required by a mitigation playbook that are designed to eliminate the malicious actor from the endpoint network element. Where the endpoint network element was previously isolated, network scan access monitor module 133 calls mitigation playbook initiation module 138. Mitigation playbook initiation module 138 is configured to start a mitigation playbook. Such a playbook may be a series of steps that are taken in sequence when a malicious actor is detected, and may include any number of actions as are known in the art that are to be performed when an malicious actor is detected attempting to perform a network services scan. Based upon the disclosure provided herein, one of ordinary skill in the art will recognize a variety of playbooks and/or processes that may be performed when a malicious actor is detected operating on an endpoint network element.

Alternatively, where the network services scan is not initiated via the bait provided by network scan bait module 134, network scan access monitor module 133 allows the requested network services scan is allowed to proceed, flags the granted request as a suspicious network access.

Lateral endpoint network element access bait module 135 is configured to provide an easy access that purportedly causes an access to another endpoint network element within the network, where the access automatically provides authorizing tokens, but in actuality is a trap for an unwary malicious actor. In some embodiments, the bait is an icon displayed by endpoint network element that appears to give easy access to another endpoint network element.

Where a request to access another endpoint network element is received via a bait provided by lateral endpoint network element access bait module 135, network scan access monitor module 133 calls endpoint network element isolation module 136 that is configured to isolate the network endpoint element from other elements on the network. Such isolation is a process whereby access to and from the endpoint network element is limited to only accesses required by a mitigation playbook that are designed to eliminate the malicious actor from the endpoint network element. In addition, network scan access monitor module 133 calls endpoint network element logging module 137 to log details of the access, and calls mitigation playbook initiation module 138. Again, mitigation playbook initiation module 138 is configured to start a mitigation playbook. Such a playbook may be a series of steps that are taken in sequence when a malicious actor is detected, and may include any number of actions as are known in the art that are to be performed when an malicious actor is detected attempting to perform a network services scan. Based upon the disclosure provided herein, one of ordinary skill in the art will recognize a variety of playbooks and/or processes that may be performed when a malicious actor is detected operating on an endpoint network element.

Figure 1C:
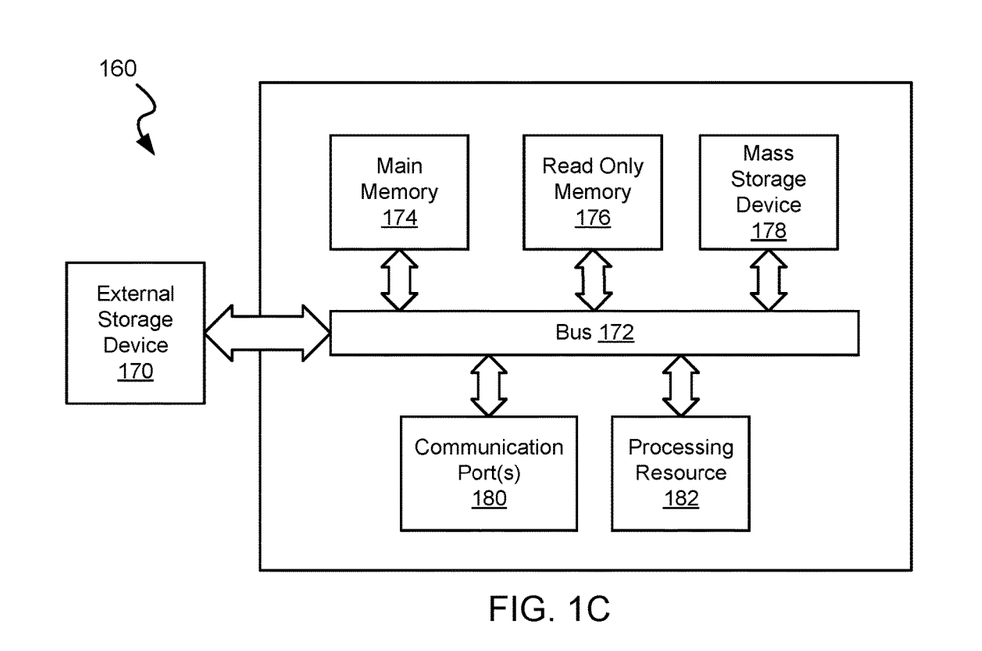

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
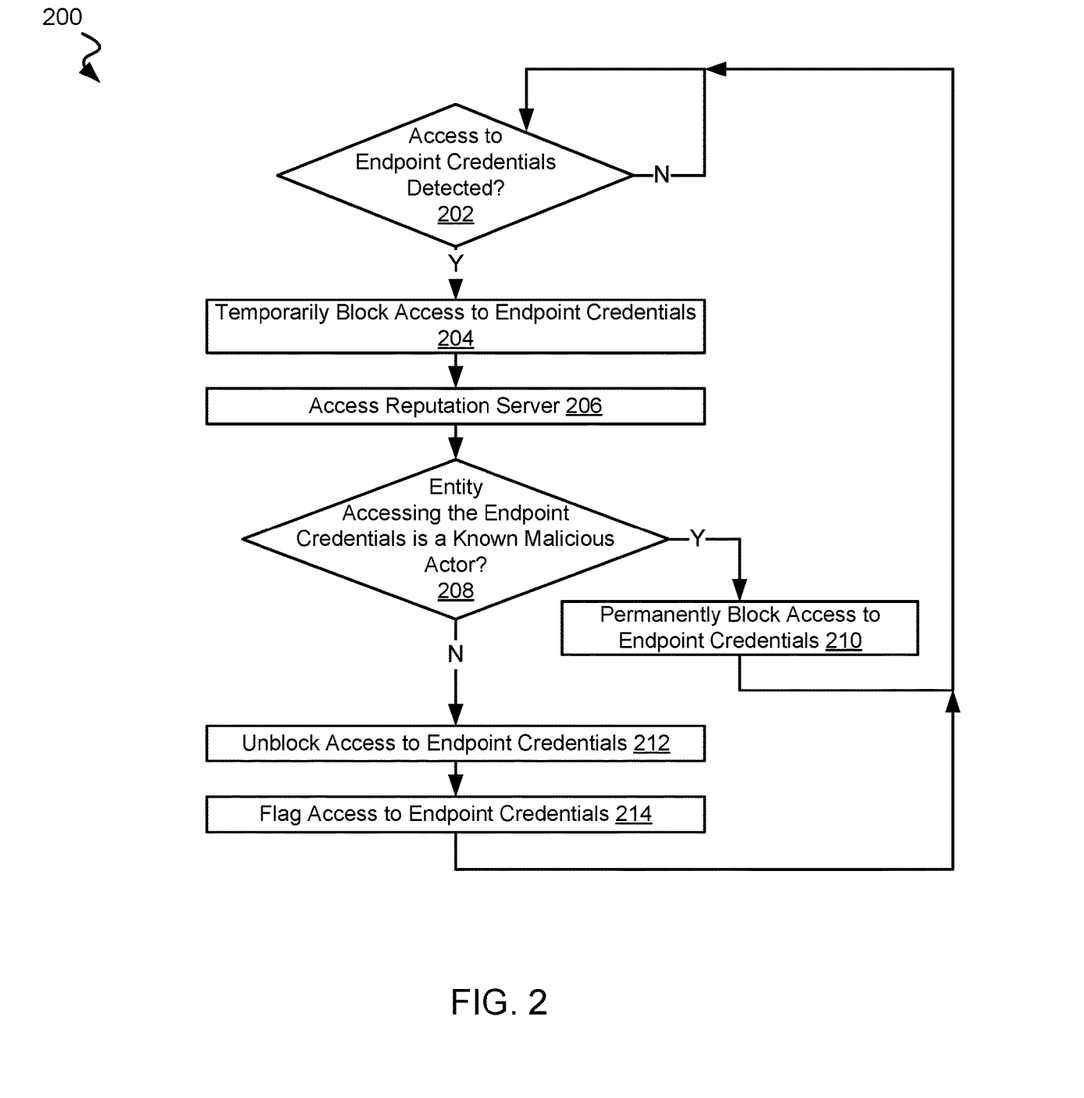
FIGS. 2-4 are flow diagrams showing methods that may be used together to disrupt lateral movement from one endpoint network element to another by a malicious actor in accordance with various embodiments.

Turning to FIG. 2, a flow diagram 200 shows a method in accordance with some embodiments for controlling access to endpoint credentials and logging attempts to access endpoint credentials. Following flow diagram 200, it is determined whether a request to access the credentials stored on an endpoint network element has been received (block 202). This may include, for example, monitoring whether an attempt has been made to dump credentials from the operating system executing on the endpoint network element or from an application executing on the endpoint network element. Such an attempt to dump credentials may be done using a number of access tools that are known in the art such as, for example, using Carbanak that obtains Windows™ logon password details. Based upon the disclosure provided herein, one of ordinary skill in the art will recognize a variety of methods that may be used to dump credentials from an endpoint network element. Monitoring to determining whether a credential dump is being attempted may include, but are not limited to, monitoring access to one or more locations where credentials of the endpoint network element are stored. Anytime such a location is accessed, an access of the credentials of the endpoint network device is flagged.

The credentials of the endpoint network element can include, but are not limited to, authorization credentials that may be used to: access services used by endpoint network element, access applications used by endpoint network element, and/or access other endpoint network elements within a secure network. Getting access to credentials to access other endpoint network elements within a secure network allows a malicious actor to move laterally between endpoint network elements within a secure network. As such, a malicious actor, having breached security protocols designed to protect a secure network, can move laterally within the secure network looking for exploitable information.

Where an access to the endpoint credentials is flagged (block 202), access to the credentials is temporarily blocked (block 204). While access to the credentials of the endpoint network element is temporarily blocked (block 204), a reputation server is accessed (block 206). This access to the reputation server includes providing information identifying an actor accessing the endpoint network element that is requesting access to the credentials. In return, the reputation server provides an indication as to whether the actor attempting access is a known malicious actor.

Where the reputation server returns an indication that the entity attempting to access the credentials is a known malicious actor (block 208), access to the credentials of the endpoint network element by the identified entity is permanently blocked. As such, the malicious actor is denied credentials that could be used to move laterally from one endpoint network element to another within a secure network.

Otherwise, where the reputation server returns an indication that the entity attempting to access the credentials is either unknown or not known to be a malicious actor (block 208), the temporary block of the credentials of the endpoint network element is released (block 212). The results in the request to the credentials being granted. In some cases, this may result in granting access to a malicious actor that was not previously known as a malicious actor to the reputation server.

This grant of the request to access the credentials of the endpoint network element is flagged (block 214). As further discussed below, flagging the access to the credentials allows for mitigation where it is later found that the entity that was granted access to the credentials is a malicious actor.

Figure 3:
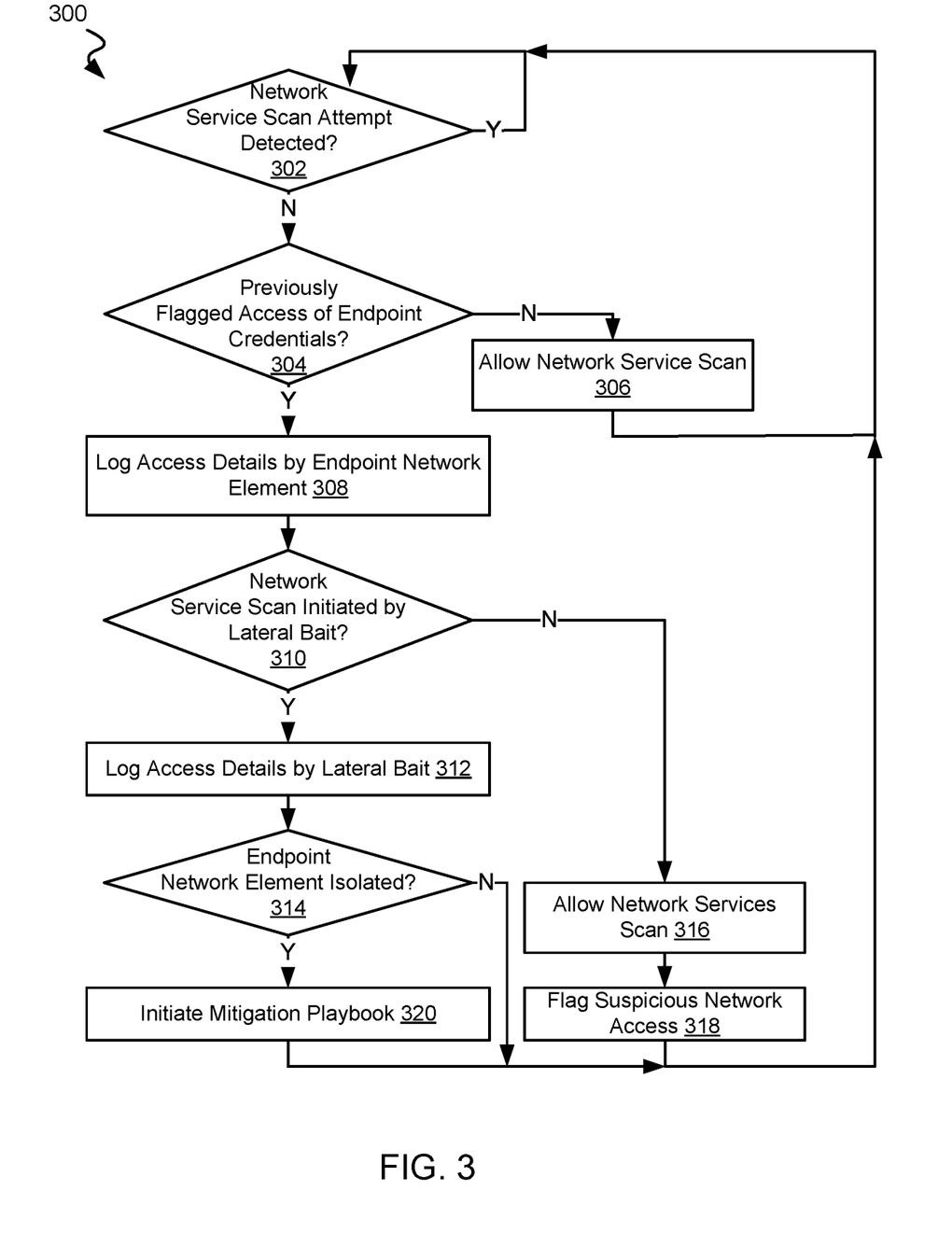

Turning to FIG. 3, a flow diagram 300 shows a method in accordance with some embodiments for detecting and/or stopping a lateral network attack after a dump of credentials on an endpoint network element has occurred. Following flow diagram 300, it is determined whether a request to perform a network service scan has been received (block 302). Such a request to perform a network service scan may be an attempt by a malicious actor to get a listing of services running on hosts within a secure network in which the endpoint network element resides and/or local network infrastructure devices within the secure network. Such a scan may be focused on listing those elements within a secure network that may be vulnerable to remote software exploitation. Such a network services scan may be done, but is not limited to, identifying port and/or vulnerability scans using tools that are brought onto a system. As an example, a network services scan requested from a particular endpoint network element may attempt to discover services running on other endpoint network elements within the same secure network. Based upon the disclosure provided herein, one of ordinary skill in the art will recognize a variety of tools that may exist on a given endpoint network element that can perform such a network services scan, and/or a variety of tools that may be introduced to a given endpoint network element to perform such a network services scan. In some embodiments, execution of any known tool for executing a network services scan constitutes a request to perform a network service scan. In other embodiments, a module is included that identifies any attempt to access another network element within the same network, and detection of such an attempt is considered a request to perform a network service scan. Based upon the disclosure provided herein, one of ordinary skill in the art will recognize other approaches for detecting a network services scan that may be done in relation to different embodiments.

Requesting a network services scan by itself may not be terribly interesting as that can be a legitimate action taken by a user of the endpoint network element. However, when that action comes shortly after dumping the credentials maintained on the endpoint network element, the request becomes more suspicious. Thus, where a request for a network services scan is detected (block 302), it is determined whether a credential dump was previously flagged (block 304). Flagging a credential dump may be done, for example, similar to that discussed above in relation to FIG. 2. In some embodiments, the flagging of a credential dump may be periodically reset to avoid the flag becoming stale. For example, in one particular embodiment, a flagged credential dump may remain set for two weeks after it is detected, and then automatically reset. In such an embodiment, the combination of blocks 302 and 304 detect whether a network services scan was performed within two weeks of a flagged credential dump. Based upon the disclosure provided herein, one of ordinary skill in the art will recognize a variety of time periods that may be used to reset a flagged credential dump in accordance with different embodiments.

Where a credential dump has not been flagged (block 304), it is considered less likely that the network services scan was requested by a malicious actor and as such the requested network services scan is allowed to proceed (block 306). Alternatively, where a credential dump has been flagged (block 304), the endpoint network element logs the access details associated with the requested network scan in preparation for a potential mitigation of a malicious actor operating on the endpoint network element (block 308). This logging may include, but is not limited to, an IP address of the actor accessing the endpoint network element and a series of behaviors exhibited by the endpoint network element leading up to the network services request. Based upon the disclosure provided herein, one of ordinary skill in the art will recognize a variety of information which may be logged in relation to a potential attack from a malicious actor.

In some embodiments, an icon is provided on a display generated by the endpoint network element that suggests that it provides a network services scan. Such an icon is provided as bait, and in actually serves as bait to expose a malicious actor and is referred to as "lateral scan bait". In embodiments where such lateral scan bait is used, it is determined whether the network services scan was requested via the lateral scan bait (block 310). Where the detected network services scan was initiated via the lateral scan bait (block 310), the initiation is considered to have been done by a malicious actor as others would be aware of the decoy nature of the icon. In such a situation, access details by the lateral scan bait are logged (block 312). This logging may be added to the log started in relation to block 308. In addition, it is determined whether the endpoint network element has previously been isolated (block 314). Such isolation is a process whereby access to and from the endpoint network element is limited to only accesses required by a mitigation playbook that are designed to eliminate the malicious actor from the endpoint network element. Where the endpoint network element was previously isolated (block 314), a mitigation playbook is initiated on one or both of the endpoint network element and/or another network element tasked with controlling the removal of any malicious actor from the endpoint network element (block 320). Such a playbook may be a series of steps that are taken in sequence when a malicious actor is detected, and may include any number of actions as are known in the art that are to be performed when an malicious actor is detected attempting to perform a network services scan. Based upon the disclosure provided herein, one of ordinary skill in the art will recognize a variety of playbooks and/or processes that may be performed when a malicious actor is detected operating on an endpoint network element.

Alternatively, where the network services scan is not initiated via the lateral scan bait (block 310), the requested network services scan is allowed to proceed (block 316). While the network services scan is allowed to proceed (block 316), it is flagged as a suspicious network access (block 318).

Figure 4:
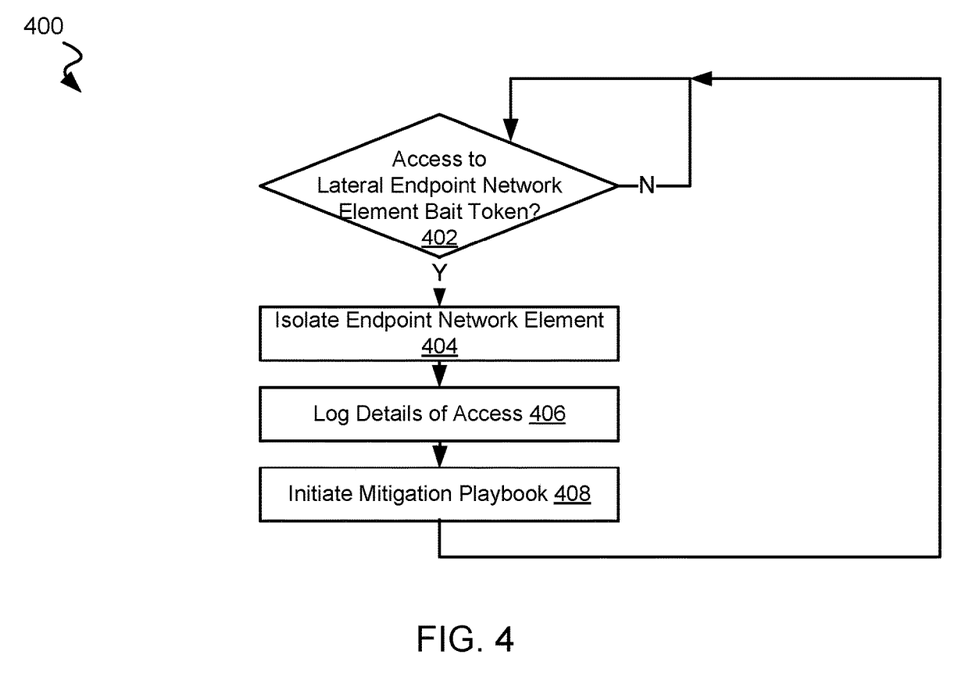

Turning to FIG. 4, a flow diagram 400 shows a method in accordance with some embodiments for detecting and/or stopping a lateral network attack after a network services scan has been flagged as suspicious. Following flow diagram 400, it is determined whether a request to access a lateral endpoint network element has been made via a bait token (block 402). For example, one or more icons may be provided that purport to access a lateral endpoint network element. Such icons are provided as bait, and in actually serve as bait to lure an unsuspecting malicious actor to select the icon as a shortcut to performing a brute force access attempt to a lateral endpoint network element. Such bait is referred to as "lateral access bait". Where the lateral access bait has been selected (block 402), the endpoint network element is isolated (block 404). Such isolation is a process whereby access to and from the endpoint network element is limited to only accesses required by a mitigation playbook that are designed to eliminate the malicious actor from the endpoint network element. In addition, details of the attempted lateral access are logged (block 406), and a mitigation playbook is initiated on one or both of the endpoint network element and/or another network element tasked with controlling the removal of any malicious actor from the endpoint network element (block 408). Such a playbook may be a series of steps that are taken in sequence when a malicious actor is detected, and may include any number of actions as are known in the art that are to be performed when an malicious actor is detected attempting to laterally access other endpoint network devices in a secured network. Based upon the disclosure provided herein, one of ordinary skill in the art will recognize a variety of playbooks and/or processes that may be performed when a malicious actor is detected operating on an endpoint network element.

In conclusion, the present disclosure provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for automatically detecting malicious, lateral movement in a network, the method comprising:
   detecting, by a processing resource of a first endpoint network element of a plurality of endpoint network elements within a communication network that is protected by a network security appliance, an attempt to perform a first behavior on the first endpoint network element, wherein the first behavior comprises accessing legitimate authorization credentials stored on the first endpoint network element;
   detecting, by the processing resource of the first endpoint network element, an attempt to perform a second behavior on a second endpoint network element of the plurality of endpoint network elements, wherein the second behavior comprises obtaining a listing of services running on the plurality of endpoint network elements via a network services scan; and
   blocking, by the processing resource of the first endpoint network element, the second behavior based at least in part on first detecting the first behavior and subsequently detecting the second behavior.

2. The method of claim 1, the method further comprising:
   removing, by the processing resource of the first endpoint network element, a malicious entity from the first endpoint network element responsible for causing the first behavior.

3. The method of claim 1, wherein the second endpoint network element would be reported if the network services scan is allowed to proceed.

4. The method of claim 1, the method further comprising:
   requesting from a reputation service, by the processing resource of the first endpoint network element, a reputation of an entity attempting to perform the first behavior on the first endpoint network element;
   receiving, by the processing resource of the first endpoint network element, an indication that the entity is not a known malicious actor;
   allowing, by the processing resource of the first endpoint network element, performance of the first behavior on the first endpoint network element based at least in part on the indication that the entity is not a known malicious actor; and
   setting, by the processing resource of the first endpoint network element, a flag at a location in the first endpoint network element indicating the performance of the first behavior on the first endpoint network element.

5. The method of claim 4, wherein blocking the second behavior based at least in part on first detecting the first behavior and subsequently detecting the second behavior includes accessing the location in the first endpoint device to determine performance of the first behavior on the first endpoint network element.

6. The method of claim 1, wherein said accessing legitimate authorization credentials stored on the first endpoint network element comprises dumping all credentials maintained on the first endpoint network element.

7. The method of claim 6, wherein said blocking is further based on said dumping all credentials maintained on the first endpoint network element and detection of the attempt to perform the second behavior occurring within a predetermined or configurable amount of time of each other.

8. A system for mitigating malicious, lateral movement in a network, the system comprising:
   a first endpoint network element of a plurality of endpoint network elements within a communication network that is protected by a network security appliance, wherein the first endpoint network element includes a process resource and a non-transitory computer readable medium coupled to the processing resource, and wherein the non transient non-transitory computer readable medium has stored therein instructions that when executed by the processing resource cause the processing resource to:
      detect an attempt to perform a first behavior on the first endpoint network element, wherein the first behavior comprises accessing legitimate authorization credentials stored on the first endpoint network element;
      detect an attempt to perform a second behavior on a second endpoint network element of the plurality of endpoint network elements, wherein the second behavior comprises obtaining a listing of services running on the plurality of endpoint network elements via a network services scan; and
      block the second behavior based at least in part on first detecting the first behavior and subsequently detecting the second behavior.

9. The system of claim 8, wherein the instructions further cause the processing resource to:
   remove a malicious entity from the first endpoint network element responsible for causing the first behavior.

10. The system of claim 8, wherein the second endpoint network element would be reported if the network services scan is allowed to proceed.

11. The system of claim 8, wherein the instructions further cause the processing resource to:
   request from a reputation service a reputation of an entity attempting to perform the first behavior on the first endpoint network element;
   receive an indication that the entity is not a known malicious actor;
   allow performance of the first behavior on the first endpoint network element based at least in part on the indication that the entity is not a known malicious actor; and
   set a flag at a location in the first endpoint network element indicating the performance of the first behavior on the first endpoint network element.

12. The system of claim 11, wherein blocking the second behavior based at least in part on first detecting the first behavior and subsequently detecting the second behavior includes accessing the location in the first endpoint device to determine performance of the first behavior on the first endpoint network element.

13. The system of claim 8, wherein said accessing legitimate authorization credentials stored on the first endpoint network element comprises dumping all credentials maintained on the first endpoint network element.

14. The system of claim 13, wherein blocking of the second behavior is further based on said dumping all credentials maintained on the first endpoint network element and detection of the attempt to perform the second behavior occurring within a predetermined or configurable amount of time of each other.

15. A non-transitory computer readable medium having stored therein instructions that when executed by a processing resource cause the processing resource to:
- detect an attempt to perform a first behavior on a first endpoint network element of a plurality of endpoint network elements within a communication network that is protected by a network security appliance, wherein the first behavior comprises obtaining a listing of services running on the plurality of endpoint network elements via a network services scan;
- detect an attempt to perform a second behavior on a second endpoint network element of the plurality of endpoint network elements, wherein the second behavior comprises lateral access to the second endpoint network element; and
- block the second behavior based at least in part on first detecting the first behavior and subsequently detecting the second behavior.

16. The non-transitory computer readable medium of claim 15, wherein the instructions further cause the processing resource to:
- display a lateral access bait; and
- wherein the attempt to perform the lateral access to the second endpoint network element is done by selecting the lateral access bait.

* * * * *